Patented Aug. 5, 1947

2,425,225

UNITED STATES PATENT OFFICE 2,425,225

PRODUCTION OF ESTERS OF THIODI-GLYCOLIC ACID

Arthur E. Bearse and Robert R. Cruse, Columbus, Ohio, assignors, by mesne assignments, to The C. P. Hall Company, Akron, Ohio, a corporation of Ohio No Drawing. Application May 18, 1945, Serial No. 594,583

9 Claims. (Cl. 260—481)

This invention relates to an improved method of making alkyl and cycloalkyl esters of thiodiglycolic acid and of alkyl-substituted thiodiglycolic acids. More particularly, it relates to the production of such esters from alkali metal sulfides and alpha-halogenated fatty acids without isolation of the intermediate thiodiglycolic acids.

Heretofore, esters of thiodiglycolic acid and its alkyl-substitution products have been prepared by three general methods, as follows:

(1) Crystalline thiodiglycolic acid was esterified with an alcohol, for example, ethyl alcohol, in the presence of hydrochloric acid (Schulze, Zeitschrift für Chemie 1865, page 78) or sulfuric acid (Seka, Berichte 58, page 1786, 1925).

(2) The acid chloride of thiodiglycolic acid was reacted with an alcohol, for example, methyl alcohol (Anschütz and Biernaux, Annalen der Chemie 273, page 69, 1893).

(3) A monohalogenated monocarboxylic acid ester, for example, butyl chloracetate, was reacted with an alkali metal sulfide in an inert organic solvent, such as acetone (U. S. Patent No. 2,262,686 to Kyrides and Zienty).

In the first method described above it is necessary to start with solid thiodiglycolic acid, which cannot be obtained economically by methods described in the prior art. Thiodiglycolic acid is best prepared by reacting sodium alpha-chloroacetate with sodium or potassium sulfide followed by acidification, but because of the fact that thiodiglycolic acid is extremely soluble in the resulting aqueous inorganic salt-containing solution, it is difficult to isolate it in pure form and in good yield. The second method described is unsatisfactory because it involves both the isolation of the thiodiglycolic acid and its conversion to the acid chloride. The third method outlined above has certain disadvantages in that it requires anhydrous sodium sulfide to give a good yield of ester, and the reaction time is unduly long, partly because of the low solubility of sodium sulfide in the organic solvent.

Since alkyl esters of thiodiglycolic acid have been found useful as plasticizers for synthetic rubber and for certain types of resins, a cheap, rapid method for their preparation is highly desirable.

It is an object of this invention to provide a simple, economical, and efficient method of producing alkyl and cyclo-alkyl esters of thiodiglycolic acid and of alkyl-substituted thiodiglycolic acids and, particularly, such esters of the relatively water-soluble acids.

It is a further object of this invention to provide a method whereby such esters may be obtained from an alkali metal sulfide and a monohalogenated fatty acid without the isolation of thiodiglycolic acid in solid form.

Other objects and advantages of the invention will be apparent from the following description.

It has been found that esters of thiodiglycolic acid and similar acids of the general formula

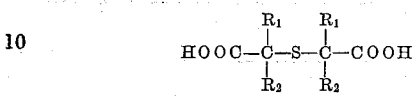

in which $R_1$ and $R_2$ represent hydrogen atoms or alkyl radicals, can be made by reacting an alkali metal sulfide with a salt of a monohalogenated fatty acid in aqueous solution, acidifying with a mineral acid, extracting the thiodiglycolic acid or alkyl-substituted acid with an aliphatic or cycloaliphatic alcohol containing from three to about eight carbon atoms, and esterifying the acid with said alcohol without isolation of thiodiglycolic acid or the alkyl-substituted acid in solid, crystalline form. The process has particular value in the treatment of thiodiglycolic acid and the alkyl-substituted acids whose solubility in water is high, for example, those alkyl-substituted acids in which neither $R_1$ nor $R_2$ contains any more than about three carbon atoms. However, it is applicable to the higher acids, for example, those in which the carbon atoms in $R_1$ plus the carbon atoms in $R_2$ may equal as much as about sixteen or even more, including, for example, the alkyl-substituted acid produced by the acidification of the reaction product of sodium sulfide and alpha-chlor stearic acid.

The advantages of producing esters of thiodiglycolic and related acids according to the present invention are obvious. By eliminating the troublesome isolation of the solid thiodiglycolic acid, there is a considerable saving in the number of operations involved in the preparation of thiodiglycolic acid esters from chloroacetic acid, sodium sulfide, and aliphatic alcohols. There is also a considerable improvement in the over-all yield of ester obtained.

According to the prior art, in order to prepare thiodiglycolic acid the aqueous solution resulting from the reaction of sodium sulfide with sodium chloroacetate is acidified with sulfuric or hydrochloric acid and subjected to crystallization. Only part of the thiodiglycolic acid separates from the aqueous solution, and a considerable portion remains behind in the mother liquors because of the fact that the acid is extremely soluble in the aqueous inorganic salt solution. Moreover, the portion of thiodiglycolic acid which crystallizes out is contaminated with inorganic salts and must be recrystallized to obtain a reasonably pure product before it can be used satisfactorily for esterification with alcohols. According to our invention, the above described isolation and purification of thiodiglycolic acid are entirely omitted.

While this invention is particularly concerned with the preparation of esters of thiodiglycolic acid, HOOC—CH$_2$—S—CH$_2$COOH, it is obvious that the process is applicable also to the preparation of esters of alkyl-substituted thiodiglycolic acids of the general formula

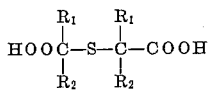

where R$_1$ and R$_2$ represent hydrogen atoms or alkyl groups of the type described. Such acids are formed in known manner by reacting an alpha-halogenated fatty acid salt with an inorganic sulfide, preferably sodium or potassium sulfide, in aqueous solution, followed by acidification with a mineral acid, such as, for example, sulfuric acid or hydrochloric acid. Representative examples of alpha-halogenated fatty acids suitable for the practice of this invention are chloracetic acid, alpha-chloropropionic acid, alpha-bromopropionic acid, alpha-chlorobutyric acid, alpha-chloroisobutyric acid, and alpha-bromolauric acid.

Alcohols which may be used in this process are the aliphatic and cycloaliphatic alcohols containing from three to about eight carbon atoms. Primary and secondary alcohols may be used, but the former are preferred because they are more readily esterified than secondary alcohols. Typical alcohols are n-propyl, n-butyl, isobutyl, n-amyl, isoamyl, n-hexyl, 2-ethylbutyl, n-octyl, and 2-ethylhexyl alcohols. Examples of other alcohols which may be used are isopropyl, secondary butyl, mixed amyl, capryl, and cyclohexyl alcohols. Alcohols containing less than three carbon atoms are unsuitable because they are too soluble in the aqueous inorganic salt-containing solution of thiodiglycolic acid to be useful as extractants. Alcohols containing more than about eight carbon atoms do not dissolve enough thiodiglycolic acid to make them effective as extractants.

Instead of using alcohols alone, we may use them in conjunction with other organic solvents, such as hydrocarbons, ethers, ketones, chlorinated hydrocarbons, etc. The use of methyl ethyl ketone is particularly advantageous when working with alcohols in which thiodiglycolic acid is only moderately soluble since methyl ethyl ketone is an excellent solvent for this acid, and because of its low boiling point it may readily be recovered from the mixture by distillation. The use of another solvent in combination with an alcohol is also advantageous when operating the process with alcohols which are quite soluble in the aqueous inorganic salt-containing solution of thiodiglycolic acid. For example, when isopropyl alcohol is employed, the presence of benzene or carbon tetrachloride decreases the solubility of the alcohol in the aqueous phase and decreases the solubility of the water in the organic solvent phase.

The extraction step in this process may be carried out batchwise, using a single portion of the alcohol or using successive portions to increase efficiency of the extraction. Preferably, the extraction is carried out by a continuous counter-current process in which a suitable alcohol is passed upward through an extraction tower and the aqueous solution containing inorganic salts and thiodiglycolic acid is passed downward through the tower. The alcohol selectively extracts the thiodiglycolic acid from the aqueous solution, and the resulting extract may be conveyed to a suitable reaction vessel for carrying out the esterification step. That portion of the alcohol which is retained by the spent aqueous salt solution after the extraction step may be recovered by distillation and recycled if desired.

In certain instances it is advantageous to carry out the extraction at slightly elevated temperatures, suitably just below the boiling point of the alcohol, in order to increase the solubility of the thiodiglycolic acid in the alcohol. For example, the solubility of thiodiglycolic acid in 2-ethylhexanol is increased from approximately 7 grams per 100 milliliters at 25° C. to approximately 30 grams per 100 milliliters at 80° C. Thus, by operating at a higher temperature, the efficiency of the extraction step of the process may be considerably increased.

According to this invention the solution of thiodiglycolic acid or alkyl-substituted thiodiglycolic acid obtained by extraction of the aqueous solution with an alcohol is used directly for the preparation of esters of said alcohol and said acids. Esterification may be brought about by heating the solution, preferably in the presence of an esterification catalyst. Examples of suitable catalysts are sulfuric acid, hydrochloric acid, and p-toluene sulfonic acid. One convenient method of carrying the esterification to completion is to reflux the mixture while distilling off a water azeotrope of the alcohol, condensing the azeotrope, and returning the alcohol to the esterification reactor. Lower boiling compounds which form azeotropes with water, such as benzene and carbon tetrachloride, etc., may be employed to aid in the azeotropic removal of water, particularly with higher boiling alcohols.

Purification of the crude esters may be accomplished by methods commonly used in the manufacture of other esters. Unreacted alcohols remaining after the esterification reaction has been completed may be recovered, for example, by distillation, and reused.

The following examples set forth certain embodiments of the invention but are not to be construed as limiting the same:

Example 1

A solution of sodium chloroacetate was prepared by dissolving 285 grams of alpha-chloroacetic acid in 450 cc. of water and neutralizing with sodium carbonate. To this solution was added during 30 minutes with agitation 360 grams of crystalline sodium sulfide. Subsequently, the mixture was heated for 3 hours at approximately 100° C. After cooling the reaction mixture to 50 to 60° C., 100 cc. of concentrated sulfuric acid were added with stirring.

The aqueous inorganic salt-containing solution of thiodiglycolic acid prepared in the above manner was extracted at a temperature of about 60° C. with five successive portions of 300 cc. each of isobutyl alcohol.

Esterification of the thiodiglycolic acid with isobutyl alcohol was carried out in the following manner. The combined extracts were transferred to a suitable reaction vessel, and 5 cc. of concentrated sulfuric acid were added as a catalyst. The reaction vessel was provided with a fractionating column. The mixture was heated under reflux, and the water-isobutyl alcohol azeotrope reaching the head of the fractionating column was separated into its components. The isobutyl alcohol layer was returned to the column as reflux, and the water was discarded from the system. As soon as esterification was substantially complete, as evidenced by the fact that no more water came over, the crude esterification mixture was cooled and washed with sodium carbonate solution and water until neutral. After distilling off most of the excess isobutyl alcohol at atmospheric pressure, the ester was vacuum distilled. The yield of diisobutyl thiodiglycolate boiling at 144 to 149° C. under 4 mm. pressure was 340 grams. This represents an 86 per cent overall yield based on the chloroacetic acid used. Most of the isobutyl alcohol which did not enter into the formation of the ester could be recovered and used again.

*Example 2*

An aqeous solution of sodium chloroacetate was prepared by neutralizing 190 grams of alphachloroacetic acid in 700 cc. of water with sodium carbonate. In a separate container a solution of sodium sulfide was prepared by dissolving 130 grams of 60 per cent sodium sulfide in 300 cc. of water. The two solutions were run simultaneously into a stirred reaction vessel which was externally cooled to maintain the temperature of the reaction mixture below 60° C. After mixing, the material was heated to approximately 100° C. for two and one-half hours. Subsequently, the mixture was cooled to 50 to 60° C., and 65 cc. of concentrated sulfuric acid were added with stirring.

The aqueous inorganic salt-containing solution of thiodiglycolic acid prepared in the manner described above was extracted at about 80° C. with five successive portions of 200 cc. each of 2-ethylhexanol.

The combined extracts were transferred to a suitable reaction vessel and mixed with 5 cc. of concentrated sulfuric acid and 700 cc. of benzene. The mixture was heated under reflux, and the water-benzene azeotrope distilling from the mixture was separated into its components. The benzene layer was returned to the esterification reactor, and the water was discarded from the system. After about two and one-half hours the esterification was substantially complete.

The crude esterification mixture was washed with water, then with sodium carbonate solution, and again with water until neutral. Most of the benzene was distilled off at atmospheric pressure, and the residue was vacuum distilled. After removal of unreacted 2-ethylhexanol there was obtained 136 grams of di-2-ethylhexyl thiodiglycolate boiling at 225–235° C. at a pressure of 5 to 6 mm. of mercury.

Other esters may be similarly prepared. For instance, the di-n-butyl ester of thiodiglycolic acid has been made in such manner and has been found to have a boiling range of 134 to 139° C. at 1 mm. pressure. Changes in the method and conditions as set forth may be made without departing from the invention as defined by the appended claims.

What we claim is:

1. The process of producing an ester of the class consisting of esters of thiodiglycolic acid and water-soluble alkyl-substituted thiodiglycolic acids which contain no alkyl substituent of more than three carbon atoms from the aqueous inorganic-salt-containing solution in which the acid has been produced by acidification of the reaction product of an alkali metal sulfide and an alpha-halogenated fatty acid salt, which comprises extracting the aqueous solution with an extractant which is not completely miscible with the aqueous solution and is composed essentially of an alcohol of the class consisting of the aliphatic and cycloaliphatic alcohols containing from three to about eight carbon atoms, and thereafter heating the alcohol extract with an esterification catalyst until substantially all of the extracted acid has been converted to an ester.

2. The process of producing an ester of the class consisting of esters of thiodiglycolic acid and water-soluble alkyl-substituted thiodiglycolic acids which contain no alkyl substitutent of more than three carbon atoms from the aqueous inorganic-salt-containing solution in which the acid has been produced by acidification of the reaction product of an alkali metal sulfide and an alpha-halogenated fatty acid salt, which comprises extracting the aqueous solution with an extractant which is not completely miscible with the aqueous solution and is composed essentially of an alcohol of the class consisting of the aliphatic and cycloaliphatic alcohols containing from three to about eight carbon atoms, and thereafter refluxing the extract in the presence of an esterification catalyst and a water-immiscible low-boiling solvent which is miscible with the alcohol solution and forms an azeotrope with water to thereby remove water from the extract as the azeotrope and continuing such refluxing until substantially all of the extracted acid has been converted to an ester.

3. The method of producing an ester of thiodiglycolic acid from the aqueous inorganic-salt-containing solution obtained in the production of the acid by acidification of the reaction product of an alkali metal sulfide and a salt of alpha-halogenated acetic acid, which comprises extracting the aqueous solution with a mixture of methyl ethyl ketone and an alcohol of the class consisting of the aliphatic and cycloaliphatic alcohols containing three to about eight carbon atoms, removing methyl ethyl ketone from the extract by distillation, and heating the residual alcoholic solution with an esterification catalyst until substantially all of the extracted thiodiglycolic acid has been converted to an ester.

4. The process of producing di-isobutyl thiodiglycolate from the aqueous inorganic-salt-containing solution in which thiodiglycolic acid has been produced by acidification of the reaction product of an alkali metal sulfide and a salt of chloroacetic acid, which comprises extracting the aqueous solution with an extractant which is not completely miscible with the aqueous solution and is composed essentially of isobutyl alcohol, and thereafter heating the extract with an esterification catalyst until substantially all of the extracted thiodiglycolic acid has been converted to di-isobutyl thiodiglycolate.

5. The process of producing di-n-butyl thiodiglycolate from the aqueous inorganic-salt-containing solution in which thiodiglycolic acid has been produced by acidification of the reaction product of an alkali metal sulfide and and a salt of chloroacetic acid, which comprises extracting the aqueous solution with an extractant which is not completely miscible with the aqueous solution and is composed essentially of n-butyl alcohol, and thereafter heating the extract with an esterification catalyst until substantially all of the extracted thiodiglycolic acid has been converted to di-n-butyl thiodiglycolate.

6. The process of producing di-2-ethylhexyl thiodiglycolate from the aqueous inorganic-salt-containing solution in which thiodiglycolic acid has been produced by acidification of the reaction product of an alkali metal sulfide and a salt of chloroacetic acid, which comprises extracting the aqueous solution with an extractant which is not completely miscible with the aqueous solution and is composed essentially of 2-ethylhexyl alcohol, and thereafter heating the extract with an esterification catalyst until substantially all of the extracted thiodiglycolic acid has been converted to di-2-ethylhexyl thiodiglycolate.

7. The process of producing an ester of thiodiglycolic acid from the aqueous inorganic-salt-containing solution in which the acid has been produced by acidification of the reaction product of an alkali metal sulfide and alpha-halogenated acetic acid, which comprises extracting the aqueous solution with an extractant which is not completely miscible with the aqueous solution and is composed essentially of an alcohol of the class consisting of the aliphatic and cycloaliphatic alcohols containing from three to about eight carbon atoms, and thereafter heating the alcohol extract with an esterification catalyst until substantially all of the extracted thiodiglycolic acid has been converted to an ester.

8. The process of producing an ester of thiodiglycolic acid from the aqueous inorganic-salt-containing solution in which the acid has been produced by acidification of the reaction product of an alkali metal sulfide and alpha-halogenated acetic acid, which comprises extracting the aqueous solution with an extractant which is not completely miscible with the aqueous solution and is composed essentially of an aliphatic alcohol containing from three to about eight carbon atoms, and thereafter refluxing the extract in the presence of an esterification catalyst and a water-miscible, low-boiling solvent which is miscible with the alcohol solution and forms an azeotrope with water to thereby remove water from the extract as the azeotrope, and continuing such refluxing until substantially all of the extracted thiodiglycolic acid has been converted to an ester.

9. The process of producing an ester of thiodiglycolic acid from the aqueous inorganic-salt-containing solution in which the acid has been produced by acidification of the reaction product of an alkali metal sulfide and alpha-halogenated acetic acid, which comprises extracting the aqueous solution with an extractant which is not completely miscible with the aqueous solution and is composed essentially of a cycloaliphatic alcohol containing from three to about eight carbon atoms, and thereafter refluxing the extract in the presence of an esterification catalyst and a water-miscible, low-boiling solvent which is miscible with the alcohol solution and forms an azeotrope with water to thereby remove water from the extract as the azeotrope, and continuing such refluxing until substantially all of the extracted thiodiglycolic acid has been converted to an ester.

ARTHUR E. BEARSE.
ROBERT R. CRUSE.

REFERENCES CITED

The following references are of record in the file of this patent:

UNITED STATES PATENTS

| Number | Name | Date |
|---|---|---|
| 2,262,686 | Kyrides et al. | Nov. 11, 1941 |
| 1,987,526 | Elbel et al. | Jan. 8, 1935 |
| 686,170 | Waite | Nov. 5, 1901 |
| 2,157,143 | Othmer | May 9, 1939 |

FOREIGN PATENTS

| Number | Country | Date |
|---|---|---|
| 845,793 | France | Sept. 1, 1939 |

OTHER REFERENCES

Gregory—"Uses and applications of chemicals and related compounds" (1944), vol. 1, p. 123, vol. II, pp. 172–173.

Dey et al., "J. Indian Chem. Soc.," vol. 5, 639–641 (1928).

Seka, Ber. Deut. Chem., vol. 58, p. 1786 (1925).

Anschutz et al., Ber. Deut. Chem., vol. 17 (1884), p. 2818.